United States Patent [19]
Valyi

[11] Patent Number: 5,884,786
[45] Date of Patent: Mar. 23, 1999

[54] PREFORM AND CLOSURE FOR BLOW MOLDED ARTICLES

[75] Inventor: Emery I. Valyi, Katonah, N.Y.

[73] Assignee: The Elizabeth and Sandor Valyi Foundtain, Inc., New York, N.Y.

[21] Appl. No.: 838,857

[22] Filed: Apr. 11, 1997

Related U.S. Application Data

[62] Division of Ser. No. 583,521, Jan. 5, 1996, abandoned.

[51] Int. Cl.$^6$ ........................................................ B65B 7/28
[52] U.S. Cl. ............................ 215/44; 215/274; 220/319; 220/634
[58] Field of Search ...................... 215/274, 44; 220/319, 220/634

[56] References Cited

U.S. PATENT DOCUMENTS

| | | | |
|---|---|---|---|
| 3,858,741 | 1/1975 | Smith, Sr. ................................ | 215/216 |
| 4,844,270 | 7/1989 | Coffman .................................. | 215/274 |
| 5,421,473 | 6/1995 | McCrossen ............................ | 220/319 |

*Primary Examiner*—Stephen K. Cronin
*Attorney, Agent, or Firm*—Bachman & LaPointe, P.C.

[57] ABSTRACT

A preform, a process for forming the preform and a container formed from the preform are disclosed. The preform comprises a tubular body portion having an open end and a closed end. At a location near the open end, a flange extends outwardly from the tubular body portion. A closure retaining element is provided for engaging a closure. The closure retaining element is formed separately from the tubular body portion and includes a manner for attachment to the tubular body portion. The closure retaining element is attached to the tubular body portion adjacent the flange via the manner for attachment.

19 Claims, 2 Drawing Sheets

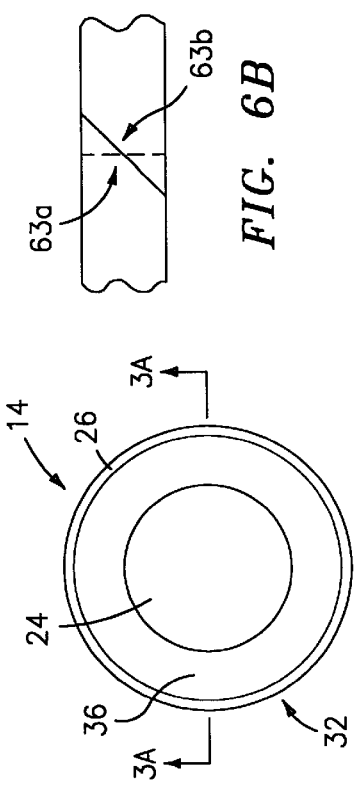
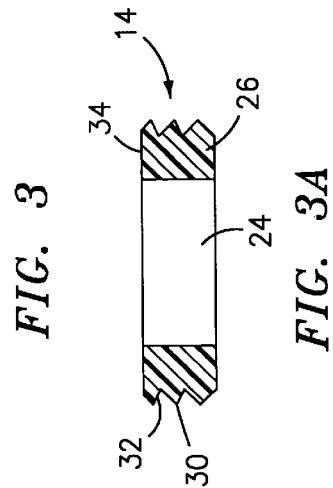
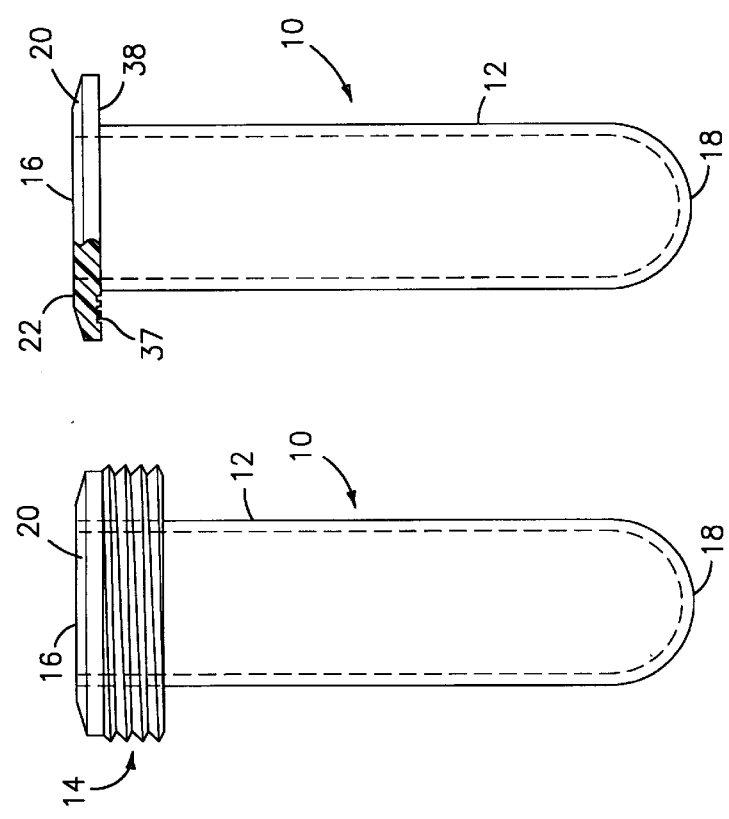
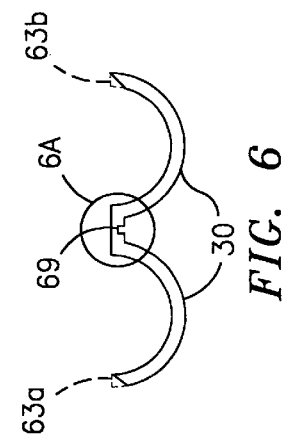
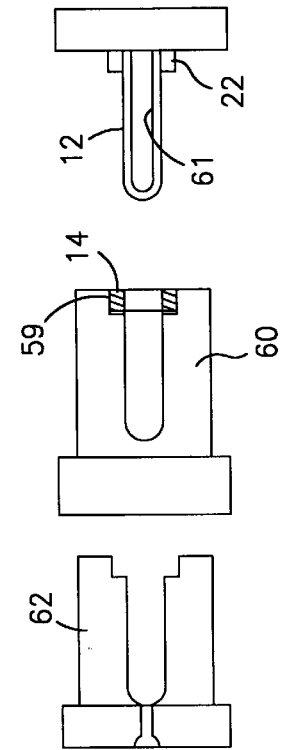

PREFORM AND CLOSURE FOR BLOW MOLDED ARTICLES

This is a division, of application Ser. No. 08/583,521, filed Jan. 5, 1996 now abandoned.

BACKGROUND OF THE INVENTION

This invention is directed to preforms and containers, and more particularly, to a simplified preform assembly including a preform having a shape and design devoid of finish moldings.

The typical preform has an outer surface including a finish which comprises moldings such as threads and a flange. Such a preform is shown in U.S. Pat. No. 4,950,514 to Strassheimer. The preform has an outside wall face with external threads and a flange. Accordingly, the preform as shown includes the typical finish moldings which, in order to mold, requires the use of a parted neck mold component, termed the neck split. Preforms could be molded at lower packing pressure, and more mold impressions could be accommodated in the same mold platen without the neck splits, since the operation of molding using neck splits requires substantially more platen space than a molding operation without neck splits.

There exists a need, therefore, for a preform having a simplified body structure, that is, with no finish requiring the use of a parted neck mold component, for allowing for the formation of preforms at lower packing pressure and for allowing for the molding of preforms in greater number on the same platen.

SUMMARY OF THE INVENTION

The primary object of this invention is to provide a simplified preform which includes a body portion having a partial neck finish, to which a separately prepared portion of neck finish is assembled to complete the neck finish.

Another object of this invention is to provide a simplified preform wherein the body portion thereof includes only a flange and the partial neck finish thereof is provided via the separately molded portion of the neck finish in the form of a closure retaining device used with the preform for retaining a closure on a container.

Still another object of this invention is to provide a process for forming a preform wherein the preform is formed from two separate components, one component providing the body portion of the preform and the other component providing a finish having closure engaging surfaces.

And still another object of this invention is to provide a container formed from the preform discussed above, wherein the container includes a closure designed for engaging a separately formed closure engaging component attached to the container.

The objects and advantages of the present invention set forth herein are achieved by a preform formed according to the principles of the present invention, which preform comprises a tubular body portion having an open end and a closed end. At a location near the open end, a flange desirably extends outwardly from the body portion. A closure retaining element is provided for engaging a closure. The closure retaining element is formed separately from the tubular body portion and includes a manner for attachment to the tubular body portion. The closure retaining element is attached to the tubular body portion adjacent the open end and desirably adjacent the flange via the manner for attachment.

A process for forming a preform in accordance with the principles of the present invention comprises the steps of forming a preform body portion having an open end and a closed end; forming separately from the body portion an element for engaging a closure, wherein the element for engaging includes a manner for attachment to the preform body portion; and attaching the element for engaging to the preform body portion via the manner for attachment. A container in accordance with the principles of the present invention comprises a cavity forming portion which includes a base for support, a body continuous with the base, a shoulder continuous with the body, and an open neck continuous with the shoulder. A flange is desirably provided which extends outwardly from the neck as well as a closure and an element for retaining the closure. The element for retaining may include threads for engaging the closure. The element for retaining is formed separately from the cavity forming portion and the closure. The element for retaining is positioned on the neck and adjacent the open neck, desirably in abutment with the flange.

The details of the present invention are set out in the following description and drawings wherein like reference characters depict like elements.

BRIEF DESCRIPTION OF THE DRAWINGS

FIG. 1 is an elevational view of a preform in accordance with the principles of the present invention including both components thereof;

FIG. 2 is an elevational view of a first component of the preform of the present invention;

FIG. 3 show a top view of a second component of the preform of the present invention;

FIG. 3A is a cross-sectional view of the second component shown in FIG. 3 taken along line 3A—3A;

FIG. 5 is a schematic view of a mold cavity, mold core, and preform transport tube in accordance with the principles of the present invention;

FIG. 6 is another embodiment of a method for molding the finish component of the preform of the present invention;

FIG. 6A is a cross-sectional enlarged view of the area 6A of the finish component in accordance with the method of FIG. 6; and FIG. 6B is an enlarged view of the finish component of FIG. 6 in the closed configuration with the free edges shown in FIG. 6 joined.

DETAILED DESCRIPTION OF THE PREFERRED EMBODIMENT

Figure 4:
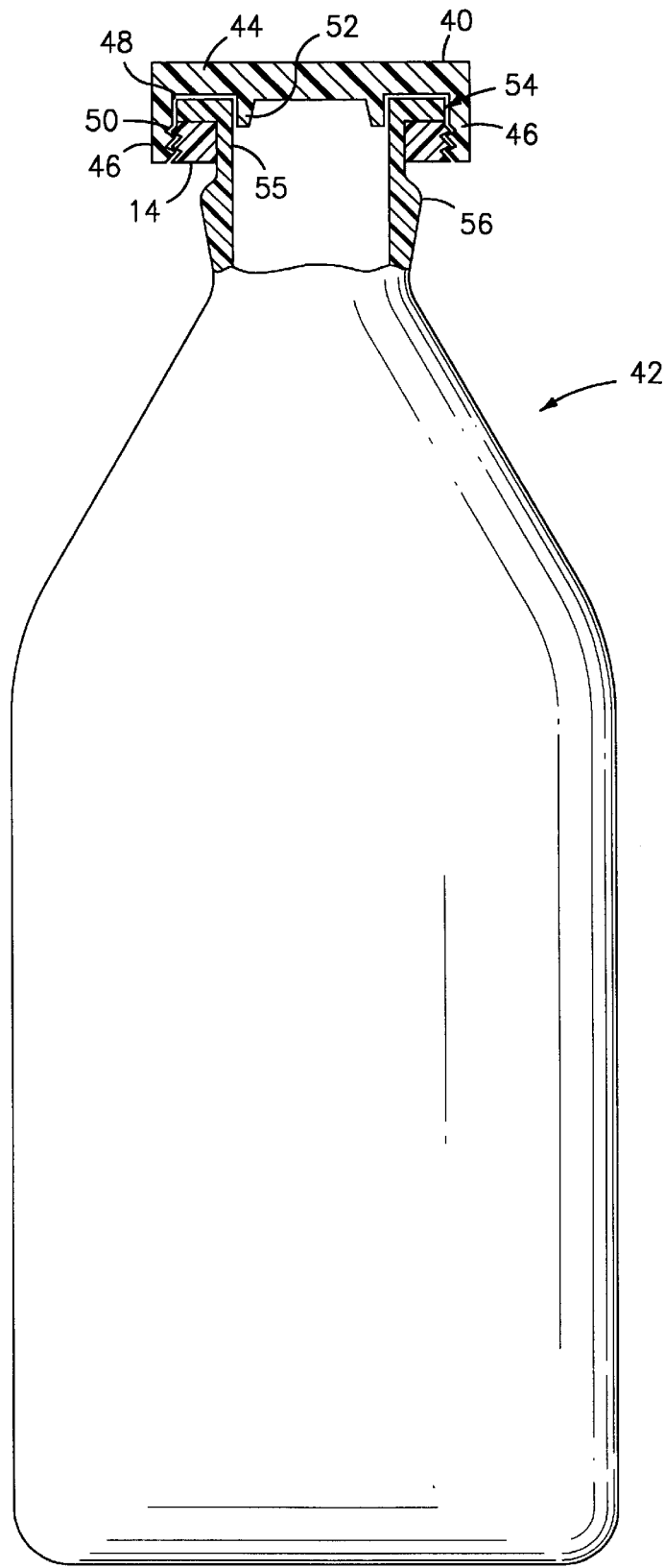
FIG. 4 is an elevational and partially cross-sectional view of a container formed in accordance with the first and second components shown in FIGS. 2 and 3.

Referring now to the drawings in detail, there is shown in FIG. 1 an elevational view of a preform in accordance with the principles of the present invention, which is designated generally as 10. Preform 10 includes two components, a body 12 and a finish 14. As shown in FIG. 1, finish 14 is adapted to engage body 12.

Referring now to FIG. 2, body 12 of preform 10 is preferably tubular in shape having an open end 16 and a closed end 18. Body 12 is designed to fit into a blow mold (not shown) for forming preform 10 into a container, such as that shown in FIG. 4. Accordingly, body portion 12 is preferably cylindrical in shape up to closed end 18. Toward open end 16 of body 12, a flange 20 is located at the circumference of body 12. Flange 20 is preferably positioned at the top most edge of body 12 and engages finish 14 to secure the same in its position when a closure is applied thereto, and includes a top-most surface 22. As can be seen from the figures, body 12 does not include threads or other means for engaging a closure. Therefore, body 12 can be more conveniently formed by injection molding or the like, since without threads to be molded, a neck mold, termed a neck split is not necessary.

Referring now to FIGS. 3 and 3A, a cross sectional and top view of finish 14 are shown, respectively. Finish 14 is preferably annular in shape with hole 24 in the center thereof to fit over body 12 of preform 10 and into attachment therewith. The fit may be a pressure fit or interference fit. Finish 14 includes a circumferential wall 26 surrounding hole 24. Circumferential wall 26 defines the circumference of finish 14 and includes an outer thread or cam 30 on outer surface 32 thereof for engagement with a closure, which thread extends circumferentially as required by the closure. Opening 24 is of a diameter such that finish 14 can be pushed or otherwise placed onto body 12. Upper surface 34 of wall 26 preferably has a plurality of serrations or other detents 36, shown in FIG. 3, therein or thereon for engagement with serrations 37 in lower wall 38 of flange 20, as shown in FIG. 2, forming mating and interlocking surfaces. Accordingly, retainer 14 when properly positioned, is pressed adjacent to and into abutment with flange 20 such that serrations 36 of upper surface 34 engage with serrations 37 on lower wall 38 of flange 20. Engagement of the serrations of upper surface 34 and base wall 28 prevent rotation of finish 14 relative to body portion 12. Other means of so securing the finish in position may be used, as known in the art.

Finish 14 is securely held into place via closure 40, shown in FIG. 4, which is used after preform 10 is blow molded into container 42 and container 42 is filled. Closure 40 has a typical cap shape, including an upper wall 44 and a circumferential wall 46 extending from upper wall 44 and defining the circumference of closure 40. On inner surface 48 of circumferential wall 46, an inner thread 50 is formed for engagement with outer thread 30 of finish 14. Concentric to circumferential wall 46, an inner ring 52 may be provided, extending from upper wall 44 in the same direction as circumferential wall 46, spaced inwardly therefrom. A space 54, indicated by an arrow, is defined between circumferential wall 46 and inner ring 52 which space is sufficient in width to receive the thickness of flange 20 of preform 10 and to allow cap 44 to be brought into sealing engagement with upper surface 22 of the flange. Accordingly, upon moving closure 40 onto finish 14 by turning and the engagement of threads 30 and 50, the closure is forced downwardly against upper surface 22 of flange 20 while the engagement of threads 30 and 50 cause finish 14 to be pulled upwardly against serrations 37 of flange 20. By this arrangement of threads 30 and 50, finish 14 is held securely against flange 20. Based on the pressure of the closure on the upper surface 22 of flange 20, a seal is formed such that a fluid is prevented from escaping the container made from preform 10.

In forming preform 10, body portion 12 is injection or otherwise molded from a plastic material, such as PET. As discussed, body portion 12 is devoid of all finish with the exception of a flange, such that no external threads or the like are molded thereon for retaining a closure. Accordingly, during molding the use of a parted mold component or neck split is avoided, thereby allowing for lower molding pressure to be used and more mold impressions to be accommodated on the same platen, as discussed above.

Further, finish 14 is formed separately from body portion 12, preferably through a molding operation similar to that used with body 12 or other pressure molding processes. It may be made from the same material as body 12, but may also be made advantageously from other materials. Thus, a compressible, elastic material, e.g., an elastomer, such as polyurethane or rubber, may be used to effect a seal, in addition to merely holding a closure in place. Finish 14 is molded with hole 24 of a size for fitting finish 14 on body 12. Accordingly, finish 14 is fitted onto body 12 into abutment with flange 20. Detents or serrations 37 on lower wall 38 of flange 20 are aligned with detents or serrations 36 on upper surface 34 of finish 14 so as to prevent finish 14 from rotating relative body 12 due to torsional forces acting thereon, such as during attachment of a closure. The detents or serrations may alternately be placed at any other interface of finish 14 and body 12, e.g., at sidewall 55 in FIG. 4. With finish 14 positioned on molded body 12 in abutment with flange 20, preform 10 is completed.

In forming container 42, preform 10 is placed into a blow mold or the like and a finished container as shown in FIG. 4 is molded. However, finish 14, as described above, being a separately formed non-integral part of preform 10 is capable of downward axial movement along preform 10, which must be minimized. Finish 14 is therefore kept from substantial axial movement on the container 42 by expansion of the preform body 12 under flange 22. It is at times necessary to secure finish 14 by adding a retaining means, such as bead 56 in FIG. 4, said bead being formed in the course of molding the container 42. Container 42 is formed by conventional expansion of preform 10 in a mold having a cavity corresponding to the desired shape of container 42. Prior to expansion, preform 10 must be assembled, i.e., finish 14 must be placed upon body 12 to adjoin flange 22. This assembly is advantageously performed as set out hereinbelow.

As is known, the removal of preform 10 from the mold in which it is made is usually effected by a plate carrying tubes 60, as shown in FIG. 5, into which the preform is pushed, i.e., stripped from its core, for example, as shown in U.S. Pat. No. 5,421,717 and similar systems known in the art. Finish 14 is placed into a suitable recess 59, as shown in FIG. 5, at the open end of receiving tube 60 before tube 60 is aligned with core 61 used with injection mold cavity 62. Accordingly, in the course of stripping, body 12 will advance into tube 60 until flange 22 abuts finish 14, as shown in FIG. 1, so that the assembly is complete when preform 10 is removed from tube 60 for transfer to a blow mold. A seal is formed via closure 40 on container 42, and if necessary, may be enhanced by finish 14 formed from an elastomeric material, as above.

As above described, finish 14 is a ring with threads on its outer surface. It may be pressure molded in that shape, however, a mold for that purpose must have many mold impressions to be economically operable. In a multiple array, such a mold is expensive because its thread forming elements require operating means which take up a great amount of space in the mold. For greater economy, the ring, i.e., finish 14, may be molded in the open or split configuration, as shown in FIGS. 6 and 6A. Accordingly, two semi-circular portions are molded, with their convex faces carrying corresponding portions of thread 30. In use, the two semi-circles are closed into a ring, i.e., finish 14, as shown in FIG. 3, before the same is applied to body 12 of preform 10. To facilitate closing the ring, hinge 59 may be provided, shown enlarged in FIG. 6A. The surfaces 63a and 63b along which the semi-circles are joined may be parallel to the ring axis as shown by the dotted lines in FIG. 6B, or angled, as shown by the solid lines in FIG. 6B, to provide a larger matching area that is self aligning to improve the sealing properties of the ring. It is readily seen that the mold in which the joined semi-circles are used is much simpler than the one for a ring, in that the thread forming part does not have to be separately movable. Also, the shape lends itself to more economical methods than injection molding, e.g., compression molding and thermoforming. The two semi-circles may of course also be separately molded and subsequently assembled into the ring shape.

The primary advantage of this invention is that a simplified preform is provided which includes a body portion having a minimal neck finish. Another advantage of this invention is that a simplified preform is provided wherein the body thereof includes only a flange and wherein a separately molded closure retaining device is used with the preform for retaining a closure on a container. Still another advantage of this invention is that a process is provided for forming a preform wherein the preform is formed from two separate components, one component providing the body portion of the preform and the other component providing closure engaging surfaces. And still another advantage of this invention is that a container is provided which is formed from the preform discussed above, wherein the container includes a closure designed for engaging a separately formed closure engaging component attached to the container. All of the above advantages may be obtained by methods of production described herein that are more expeditious than methods currently used.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A preform comprising:
   a preform having an open end and a closed end;
   a closure retaining means for engaging a closure, said closure retaining means for engaging a closure formed separately from said preform and including means for attachment to said preform, said closure retaining means attached to said preform adjacent said open end via said means for attachment; and
   further including means for preventing rotation of said closure retaining means relative said preform, wherein said means for preventing rotation is comprised of interlocking mating surfaces of said preform and said means for engaging.

2. A preform according to claim 1, wherein said preform includes a tubular body portion and including a flange extending outwardly from said tubular body portion at a location near said open end, wherein said closure retaining means is attached to said tubular body portion adjacent said flange via said means for attachment.

3. The preform according to claim 2, wherein said means for preventing rotation is provided on each of said flange and said closure retaining means, said interlocking surfaces adapted to engage and prevent relative rotation.

4. The preform according to claim 2, wherein said means for attachment comprises said closure retaining means including an opening in which said tubular body portion is inserted, said opening having a size for causing an interference fit between said closure retaining means and said tubular body portion.

5. The preform according to claim 2, wherein said closure retaining means includes means for creating a seal.

6. The preform according to claim 5, wherein said means for creating a seal comprises said closure retaining means formed from an elastomeric material.

7. The preform according to claim 2, wherein said closure retaining means comprises two connected halves, said halves having an open and a closed configuration, wherein said halves are molded in said open configuration and form said closure retaining means in said closed configuration.

8. The preform according to claim 7, wherein each of said halves are semi-circular in shape and include closure engaging surfaces, said halves connected by a hinge.

9. The preform according to claim 2, wherein said closure retaining means is separately formed from said tubular body portion, said closure retaining means adapted to abut said flange.

10. The preform according to claim 9, wherein said closure retaining means includes a circumferential surface including means for engaging said closure.

11. The preform according to claim 10, wherein said means for engaging comprises one of a thread and a cam for engaging a thread on an inner surface of said closure.

12. The preform according to claim 10, wherein said closure retaining means has an upper surface in abutment with said flange, said upper surface having a circumferential edge and said thread extending downwardly from said flange.

13. A process for forming a preform, comprising the steps of:
    forming a preform body portion having an open end and a closed end;
    forming separately from said body portion a means for engaging a closure, said means for engaging including means for attachment to said preform body portion;
    attaching said means for engaging to said preform body portion via said means for attachment; and
    further including the step of preventing said means for engaging from rotating relative said preform body portion, wherein said step of preventing includes interlocking mating surfaces of said preform body Portion and said means for engaging.

14. The process according to claimed 13, wherein said step of forming a preform body portion further includes forming a flange near said open end of said body portion.

15. The process according to claim 14, wherein said step of attaching includes pressure fitting said means for engaging on said body portion until said means for engaging abuts said flange.

16. The process according to claim 13, wherein said step of forming separately said means for engaging includes forming said means for engaging as two halves.

17. The process according to claim 16, wherein during said step of forming separately said means for engaging, said two halves are formed connected together.

18. The process according to claim 16, further comprising the step of attaching said two halves together to form said means for engaging.

19. The process according to claim 16, wherein each of said two halves are semi-circular in shape and include closure engaging surfaces.

* * * * *